United States Patent
Mennig et al.

(10) Patent No.: US 8,119,221 B2
(45) Date of Patent: Feb. 21, 2012

(54) COMPOSITION HAVING A NON-NEWTONIAN BEHAVIOR

(75) Inventors: Martin Mennig, Quierschied (DE); Peter W. Oliveira, Saarbrücken (DE); Helmut Schmidt, Saarbruecken-Guedingen (DE)

(73) Assignee: Leibniz-Institut Fuer Neue Materialien Gemeinnuetzige GmbH, Saarbruecken (DE)

( * ) Notice: Subject to any disclaimer, the term of this patent is extended or adjusted under 35 U.S.C. 154(b) by 1626 days.

(21) Appl. No.: 11/269,593

(22) Filed: Nov. 9, 2005

(65) Prior Publication Data

US 2006/0089442 A1    Apr. 27, 2006

Related U.S. Application Data

(63) Continuation of application No. PCT/EP2004/005619, filed on May 25, 2004.

(30) Foreign Application Priority Data

May 26, 2003   (DE) ................... 103 23 729

(51) Int. Cl.
*B32B 5/00* (2006.01)
*B32B 9/04* (2006.01)

(52) U.S. Cl. ............ 428/141; 106/287.13; 106/287.16; 106/287.17; 106/287.19; 428/143; 428/145; 428/156; 428/195.1; 428/206; 428/447

(58) Field of Classification Search .................. None
See application file for complete search history.

(56) References Cited

U.S. PATENT DOCUMENTS

| | | | |
|---|---|---|---|
| 4,324,712 A * | 4/1982 | Vaughn, Jr. .................. 524/767 |
| 4,895,767 A | 1/1990 | Mori et al. | |
| 4,990,376 A * | 2/1991 | Patel ............................ 427/387 |
| 5,593,781 A | 1/1997 | Nass et al. | |
| 5,644,014 A | 7/1997 | Schmidt et al. | |
| 5,755,867 A | 5/1998 | Chikuni et al. | |
| 5,766,680 A | 6/1998 | Schmidt et al. | |
| 6,132,649 A * | 10/2000 | Cauda et al. .................. 264/1.21 |
| 6,236,493 B1 | 5/2001 | Schmidt et al. | |
| 6,262,162 B1 | 7/2001 | Lan et al. | |
| 6,291,070 B1 | 9/2001 | Arpac et al. | |
| 6,358,601 B1 * | 3/2002 | Bilkadi ......................... 428/323 |
| 6,399,690 B2 | 6/2002 | Lan et al. | |
| 6,476,098 B1 | 11/2002 | Arakawa et al. | |
| 6,855,371 B2 | 2/2005 | Gier et al. | |
| 7,351,470 B2 * | 4/2008 | Draheim et al. ............... 428/339 |
| 2001/0025076 A1 | 9/2001 | Lan et al. | |
| 2004/0026832 A1 | 2/2004 | Gier et al. | |

FOREIGN PATENT DOCUMENTS

| | | |
|---|---|---|
| DE | 4118184 | 12/1992 |
| DE | 4212633 | 10/1993 |
| DE | 4417405 | 11/1995 |
| DE | 19613645 | 10/1997 |
| DE | 19746885 | 6/1999 |
| EP | 0195493 | 9/1986 |
| EP | 1038834 | 9/2000 |
| GB | 1459025 | 12/1976 |
| JP | 7-505359 A | 6/1995 |
| JP | 2000-319013 A | 11/2000 |
| JP | 2000-327930 A | 11/2000 |
| JP | 2003-73558 A | 3/2003 |
| WO | 92/21729 | 12/1992 |
| WO | 93/21127 | 10/1993 |
| WO | 95/31413 | 11/1995 |
| WO | 98/51747 | 11/1998 |
| WO | 01/51220 | 7/2001 |
| WO | WO 2006/016729 A1 * | 2/2006 |

OTHER PUBLICATIONS

English language Abstract DE 19746885.
English language abstract of JP 2003-73558 A.
English language abstract of JP 2000-327930 A.
English language abstract of JP 2000-319013 A.

* cited by examiner

*Primary Examiner* — Marc Zimmer
(74) *Attorney, Agent, or Firm* — Abel Law Group, LLP

(57) ABSTRACT

A composition with non-Newtonian behaviour which comprises a matrix former and nanoscale solid particles whose surface charge has been increased by reaction with an acid or base, and a process for the preparation thereof. The process is suitable for adjusting the rheology of materials.

19 Claims, 1 Drawing Sheet

COMPOSITION HAVING A NON-NEWTONIAN BEHAVIOR

CROSS-REFERENCE TO RELATED APPLICATIONS

The present application is a continuation of International Application No. PCT/EP2004/005619, filed May 25, 2004, the entire disclosure whereof is expressly incorporated by reference herein, which claims priority under 35 U.S.C. §119 of German Patent Application 103 23 729.1, filed May 26, 2003.

BACKGROUND OF THE INVENTION

1. Field of the Invention

The present invention relates to a composition with non-Newtonian behaviour, to a process for its preparation, to coated substrates obtainable with the compositions, and to the use of these coated substrates.

2. Discussion of Background Information

It is common knowledge that the rheology of coating solutions can be influenced by adding particulate solids. This knowledge is utilized, for example, in the case of wall paints, which, using pigments or other particles (e.g. Aerosil), are given a pseudoplastic formulation so that they do not drip and do not develop runs. Similar effects are known, too, for nanocomposites which comprise nanoscale particulate solids. The general rule here is that, the greater the amount of particles, the greater the extent to which the rheology can be influenced. It is not always possible, though, or is a disadvantage, to use such high particle concentrations. For example, the composite material becomes too brittle as a result, or too expensive, or high particle contents may even lead to unwanted side-effects, owing to the particle properties. There is therefore a need for a tool for adjusting the rheology that is independent of the particle concentration. It has surprisingly been found that it is possible to adjust the rheology independently of the particle concentration by purposively varying the surface charge of the particles in nanoparticulate dispersions, which may constitute a sol, for example.

SUMMARY OF THE INVENTION

The present invention provides a composition with non-Newtonian behaviour. This composition comprises a matrix former and nanoscale solid particles. The surface charge of these particles has been increased by reaction with an acid or a base.

In one aspect of the composition, the surface charge of the particles may have been increased by reaction with the acid or the base to increase the absolute value of the zeta potential.

In another aspect of the composition, the nanoscale solid particles may account for at least 5% by weight of the total weight of the composition.

In yet another aspect, the matrix former may comprise a crosslinkable matrix former, for example, an organic polymer, an organically modified inorganic polycondensate and/or a precursor thereof. In one aspect, the organically modified inorganic polycondensate and/or precursor thereof may comprise a polyorganosiloxane and/or precursor thereof. In another aspect, the organic polymer, organically modified inorganic polycondensate and/or precursor thereof may comprise organic radicals having functional groups by way of which crosslinking is possible.

In a still further aspect of the composition of the present invention, the particles may comprise metal oxide particles. For example, the metal oxide particles may comprise one or more of $SiO_2$, $Al_2O_3$, ITO, ATO, AlOOH, $Ta_2O_5$, $ZrO_2$ and $TiO_2$.

In another aspect, the composition of the present invention may further comprise inert nanoscale particulate solids (i.e., inert nanoscale solid particles).

In another aspect of the composition, the particles thereof may have an average particle diameter (volume average determined by X-ray spectrometry) of not more than 200 nm.

In yet another aspect, the particles may comprise surface-modified particles. For example, the particles may be surface-modified with electrosteric and/or protic groups.

In a still further aspect, the composition of the present invention may be thixotropic or pseudoplastic.

The present invention also provides a coating composition, a composition for film casting and a printing paste, all of which comprise the composition of the present invention as set forth above, including the various aspects thereof.

The present invention also provides a process for preparing a composition which comprises a matrix former and nanoscale solid particles. The process comprises mixing the particles or a sol thereof with the matrix former and, optionally, a solvent, and increasing the surface charge of the particles by adding a base or an acid thereto to afford a composition with non-Newtonian behaviour.

In one aspect of the process, the surface charge of the particles may be increased by adding to the sol of the particles an acid or a base prior to mixing the particles with the matrix former.

In another aspect, the sol may comprise a protic solvent in which the matrix former is soluble and/or dispersible, or with which the matrix former is miscible.

In yet another aspect, an acid may be used to increase the surface charge of the particles. Alternatively, a base may be used to increase the surface charge of the particles. For example, the base may comprise an amine and/or a quaternary ammonium hydroxide.

In a still further aspect, the process may comprise the application of the composition onto a substrate, followed by rendering the composition non-Newtonian.

The present invention also provides a process for adjusting the rheology behaviour of a composition which comprises a matrix former and nanoscale solid particles. This process comprises mixing the particles (or a sol thereof with the matrix former and, optionally, a solvent, and increasing the surface charge of the particles by adding a base or an acid to afford a composition with non-Newtonian behaviour.

The present invention also provides a substrate with a coating, which coating comprises a cured and/or compacted composition according to the present invention as set forth above, including the various aspects thereof.

In one aspect, the coating may have a microstructured surface relief.

The present invention further provides an optical device, including a holographic device, an electronic device, a micromechanical device, and a dirt repellent article, all of which comprise the coated substrate of the present invention as set forth above.

As set forth above, the present invention provides a composition with non-Newtonian behaviour that comprises a matrix former having a defined viscosity, such as a binder, and nanoscale particulate solids, preferably inorganic, the surface charge of the particles being adjusted for example by the concentration of an acid or base. In just the same way the particles can be modified beforehand with surface groups, preferably protic surface groups, which with an acid or base are able to change or form charges in accordance with the acid/base concentration. The composition can be, for example, a mass or a fluid.

The present invention further provides a process for preparing a composition comprising a matrix former and nanoscale particulate solids, wherein the particulate solids or a sol of the particulate solids are or is mixed with the (for example) soluble, liquid or dissolved matrix former and, if desired, a solvent to give, after partial or complete removal of the solvent where appropriate, a composition with non-Newtonian behaviour, the process being characterized in that the surface charge of the particles is increased by adding a base or an acid.

Without wishing to be bound by any theory it is assumed that the phenomena of the modification of the rheology can be explained as the change in pH resulting in a change in the surface charge of the particles and hence in the zeta potential of the particles. Consequently the forces of interaction between the particles are influenced or steered in the desired direction, thereby influencing the rheology of the composition. As a result of the extremely small dimensions of the nanoscale particulate solids (nanoparticles) used the average interparticulate distances between them are comparatively small for a given volume fraction, so that, for example, the Coulomb interaction, but also other forms of interaction, such as hydrogen bonds, for example, are manifested noticeably.

The advantageous influencing of the rheology of such compositions through the inventive increase of the surface charge is also evident from the comparative experiments described below, which are illustrated in FIGS. 1 and 2. From those it is apparent that the addition of base or acid for increasing the surface charge (and hence the zeta potential) has a strong influence on the rheological behaviour of the composition. The increase is of course related to the absolute amounts of the surface charges, as will be set forth below.

In contrast to the prior art compositions (FIG. 1), with the inventive compositions (FIG. 2) the increase in the surface charge results in particular in a shortening of the relaxation time of the viscosity, which is even more pronounced as the shear rate drops, which is of particular significance in the case of embossing or printing processes, for example. For non-Newtonian coatings, short relaxation times of the viscosity are generally advantageous, since longer relaxation times lead to more rapid smoothing of the structures and hence to a greater propensity to run, or to a deterioration in the trueness to shape.

Compositions with non-Newtonian behaviour, and measures for their preparation, are familiar to the person skilled in the art. Non-Newtonian materials do not exhibit ideal viscosity behaviour on flow, for example. The compositions of the invention with non-Newtonian behaviour are preferably compositions which are pseudoplastic or thixotropic. If the composition has been converted into a non-Newtonian composition it may frequently be present in the form of a gel.

The composition comprises a matrix-forming component. The matrix former can be, for example, a binder. As matrix formers or binders it is possible to use those which are familiar to the person skilled in the art, such as are used for paints or varnishes, for example. These are matrix formers and/or binders, for example, based on organic polymers or on organically or inorganically modified inorganic polycondensates, or are combinations thereof. The matrix former can also be used in the form of the precursors of the organic polymers or of the organically or inorganically modified inorganic polycondensates. The matrix former or binder is preferably crosslinkable; that is, it possesses functional groups by way of which crosslinking is possible. The matrix former or the binder forms the matrix in which the nanoparticles are contained. Systems of this kind are referred to as nanocomposites. As well as the nanoparticles, which influence the rheology in relation to the addition of acid or base, it is of course also possible in this context for inert nanoparticles to be present, as will be set forth below.

As matrix formers or binders it is possible to use organic polymers that are known to the person skilled in the art, e.g. polyacrylic acid, polymethacrylic acid, polyacrylates, polymethacrylates, polyolefins, e.g. polybutadiene, polystyrene, polyamides, polyimides, polyvinyl compounds, such as polyvinyl chloride, polyvinyl alcohol, polyvinyl butyral, polyvinyl acetate and corresponding copolymers, e.g. poly(ethylene-vinyl acetate), polyesters, e.g. polyethylene terephthalate or polydiallyl phthalate, polyarylates, polycarbonates, polyethers, e.g. polyoxymethylene, polyethylene oxide or polyphenylene oxide, polyether ketones, polysulphones, polyepoxides, and fluoropolymers, e.g. polytetrafluoroethylene. It is also possible to use precursors thereof. Preferably there are functional groups present by way of which crosslinking is possible.

Matrix formers or binders based on purely inorganic polycondensates may be formed from hydrolysable starting compounds, especially metal alkoxides or alkoxysilanes. Examples of hydrolyzable starting compounds which can be used, and processes for their preparation, are indicated below.

Particularly good results are obtained with matrix formers based on organically modified inorganic polycondensates (ormocers), preferably polyorganosiloxanes, or their precursors. A further improvement may be obtained if the organically modified inorganic polycondensates or precursors thereof include organic radicals containing functional groups by way of which crosslinking is possible. Binders based on organically modified inorganic polycondensates which are suitable for the present invention are described, for example, in DE 19613645, WO 92/21729 and WO 98/51747, hereby incorporated by reference. These constituents are set forth in detail below.

The organically modified inorganic polycondensates or precursors thereof are prepared in particular by hydrolysis and condensation of hydrolysable starting compounds in accordance with the known sol-gel method. By precursors in this context are meant, in particular, prehydrolysates and/or precondensates having a relatively low degree of condensation. The hydrolysable starting compounds comprise element compounds containing hydrolysable groups, with at least some of these compounds also comprising non-hydrolysable groups, or oligomers thereof. Preferably at least 50 mol % and with particular preference at least 80 mol % of the hydrolysable starting compounds used contain at least one non-hydrolysable group.

The hydrolysable starting compounds that are used to prepare the organically modified inorganic polycondensates or precursors thereof are particularly compounds of at least one element M from main groups III, IV and V and/or transition groups II to V of the Periodic Table of the Elements. The element is preferably a metal, which here includes Si and B. The compounds are preferably hydrolysable compounds of Si, Al, B, Sn, Ti, Zr, V or Zn, especially those of Si, Al, Ti or Zr, or mixtures of two or more of these elements. On this point it is noted that it is of course possible to use other hydrolysable compounds as well, especially those of elements from main groups I and II of the Periodic Table (e.g. Na, K, Ca and Mg) and from transition groups VI to VIII of the Periodic Table (e.g. Mn, Cr, Fe, and Ni). Hydrolysable compounds of the lanthanides may also be used. Preferably, however, the last-mentioned compounds account for not more than 40 mol-% and in particular not more than 20 mol % of the total hydrolysable monomeric compounds used.

As a hydrolysable starting compound which contains at least one non-hydrolysable group, preference is given to using hydrolysable organosilanes or oligomers thereof. Accordingly, organosilanes which can be used are set forth in more detail below. Corresponding hydrolysable starting compounds of other of the abovementioned elements are derived analogously from the hydrolysable and non-hydrolysable radicals listed below, taking into account where appropriate the differing valency of the elements.

One preferred matrix former comprises a polycondensate, or precursors thereof, which is obtainable, for example, by the sol-gel method and is based on one or more silanes of the general formula $R_aSiX_{(4-a)}$ (I), in which the radicals R are identical or different and are non-hydrolysable groups, the radicals X are identical or different and are hydrolysable groups or hydroxyl groups, and a is 1, 2 or 3, preferably 1, or an oligomer derived therefrom.

In the general formula (I) the hydrolysable groups X, which may be identical or different from one another, are, for example, hydrogen or halogen (F, Cl, Br or I), alkoxy (preferably $C_{1-6}$ alkoxy, such as methoxy, ethoxy, n-propoxy, isopropoxy and butoxy, for example), aryloxy (preferably $C_{6-10}$ aryloxy, such as phenoxy, for example), acyloxy (preferably $C_{1-6}$ acyloxy, such as acetoxy or propionyloxy, for example), alkylcarbonyl (preferably $C_{2-7}$ alkylcarbonyl, such as acetyl, for example), amino, monoalkylamino or dialkylamino having preferably from 1 to 12, in particular from 1 to 6, carbon atoms. Preferred hydrolysable radicals are halogen, alkoxy groups and acyloxy groups. Particularly preferred hydrolysable radicals are $C_{1-4}$ alkoxy groups, especially methoxy and ethoxy.

The non-hydrolysable radicals R, which may be identical to or different from one another, may be nonhydrolysable radicals R containing a functional group by way of which crosslinking is possible, or may be non-hydrolysable radicals R without a functional group.

The non-hydrolysable radical R without a functional group is, for example, alkyl (preferably $C_{1-8}$ alkyl, such as methyl, ethyl, n-propyl, isopropyl, n-butyl, s-butyl and t-butyl, pentyl, hexyl, octyl or cyclohexyl), aryl (preferably $C_{6-10}$ aryl, such as phenyl and naphthyl for example) and also corresponding alkylaryls and arylalkyls. The radicals R and X may where appropriate contain one or more customary substituents, such as halogen or alkoxy, for example.

Specific examples of functional groups by way of which crosslinking is possible are, for example, the epoxide, hydroxyl, ether, amino, monoalkylamino, dialkylamino, optionally substituted anilino, amide, carboxyl, vinyl, allyl, alkynyl, acryloyl, acryloyloxy, methacryloyl, methacryloyloxy, mercapto, cyano, alkoxy, isocyanato, aldehyde, alkylcarbonyl, acid anhydride and phosphoric acid groups. These functional groups are attached to the silicon atom by way of alkylene, alkenylene or arylene bridge groups, which may be interrupted by oxygen or —NH— groups. Examples of non-hydrolysable radicals R containing vinyl or alkynyl group are $C_{2-6}$ alkenyl, such as vinyl, 1-propenyl, 2-propenyl and butenyl, and $C_{2-6}$ alkynyl, such as acetylenyl and propargyl, for example. The said bridge groups and any substituents present, as in the case of the alkylamino groups, are derived, for example, from the abovementioned alkyl, alkenyl or aryl radicals. Of course, the radical R may also contain more than one functional group.

Specific examples of non-hydrolysable radicals R containing functional groups by way of which crosslinking is possible are a glycidyl- or a glycidyloxy-$(C_{1-20})$-alkylene radical, such as β-glycidyloxyethyl, γ-glycidyloxypropyl, δ-glycidyloxybutyl, ε-glycidyloxypentyl, ω-glycidyloxyhexyl, and 2-(3,4-epoxycyclohexyl)ethyl, a (meth)acryloyloxy-$(C_{1-6})$-alkylene radical, where $(C_{1-6})$-alkylene is, for example, methylene, ethylene, propylene or butylene, and a 3-isocyanatopropyl radical.

Specific examples of corresponding silanes are γ-glycidyloxypropyltrimethoxysilane (GPTS), γ-glycidyloxypropyltriethoxysilane (GPTES), 3-isocyanatopropyltriethoxysilane, 3-isocyanatopropyldimethylchlorosilane, 3-aminopropyltrimethoxysilane (APTS), 3-aminopropyltriethoxysilane, N-(2-aminoethyl)-3-aminopropyltrimethoxysilane, N-[N'-(2'-aminoethyl)-2-aminoethyl]-3-aminopropyltrimethoxysilane, hydroxymethyltriethoxysilane, bis(hydroxyethyl)-3-aminopropyltriethoxysilane, N-hydroxyethyl-N-methylaminopropyltriethoxysilane, 3-(meth)acryloyloxypropyltriethoxysilane and 3-(meth)acryloyloxypropyltrimethoxysilane. Further examples of hydrolysable silanes which can be used in accordance with the invention can be found, for example, in EP-A-195493, inter alia.

Preferred examples of such functional groups are aboverecited glycidyloxy and (meth)acryloyloxy radicals. In one preferred embodiment, use is made of organically modified inorganic polycondensates or precursors thereof based on hydrolysable starting compounds, with at least some of the hydrolysable compounds used having at least one non-hydrolysable radical containing a crosslinkable functional group. For example, at least 50 mol %, and with preference at least 80 mol %, of the hydrolysable starting compounds used contain at least one such crosslinkable group. Particular preference is given to γ-glycidyloxypropyltrimethoxysilane (GPTS), γ-glycidyloxypropyltriethoxysilane (GPTES), 3-(meth)acryloyloxypropyltriethoxysilane and 3-(meth)acryloyloxypropyltrimethoxysilane.

It is also possible to use organically modified inorganic polycondensates or precursors thereof which contain, at least in part, organic radicals substituted by fluorine. For this purpose it is possible to use hydrolysable silanes having at least one non-hydrolysable radical having from 1 to 30 fluorine atoms attached to carbon atoms which are preferably separated from Si by at least two atoms. Hydrolysable groups which can be used in this case include, for example, those specified for X in formula (I). Specific examples of fluorosilanes include $C_2F_5$—$CH_2CH_2$—$SiZ_3$, n-$C_6F_{13}$—$CH_2CH_2$—$SiZ_3$, n-$C_8F_{17}$—$CH_2CH_2$—$SiZ_3$ and n-$C_{10}F_{21}$—$CH_2CH_2$—$SiZ_3$ (Z=$OCH_3$, $OC_2H_5$ or Cl); iso-$C_3F_7O$—$CH_2CH_2CH_2$—$SiCl_2(CH_3)$, n-$C_6F_{13}$—$CH_2CH_2$—$SiCl_2(CH_3)$ and n-$C_6F_{13}$—$CH_2CH_2$—$SiCl(CH_3)_2$. The result of using a fluorinated silane of this kind is that the corresponding coating is additionally given hydrophobic and oleophobic properties. Silanes of this kind are described in detail in DE 4118184.

As already set out above, the organically modified inorganic condensates may also be prepared using in part hydrolysable starting compounds containing no non-hydrolysable groups. For the hydrolysable groups which can be used and the elements M which can be used, refer to the above remarks. Particular preference is given for this purpose to using alkoxides of Si, Zr and Ti. These compounds have, for example, the formula $MX_b$, in which M is as defined above, X is defined as in formula (I), preferably halogen or alkoxy, and b corresponds to the valency of the element. Preferred compounds are of the formula $MX_4$, with M=Si, Ti or Zr, especially $Si(OMe)_4$ or $Si(OEt)_4$. Where exclusively these compounds without non-hydrolysable groups are employed, the products are purely inorganic condensates. Condensates with hydrolysable starting compounds which contain no non-hydrolysable groups are also described, for example, in WO 95/31413 (DE 4417405).

The matrix former can be obtained from the hydrolysable compounds in particular by the sol-gel method. In the sol-gel method, which can also be used for preparing the nanoparticles, hydrolysable compounds are hydrolysed with water, where appropriate with acidic or basic catalysis, and if desired are at least partly condensed. The hydrolysis and/or condensation reactions lead to the formation of compounds or condensates having hydroxyl or oxo groups and/or oxo bridges, which serve as precursors. It is possible to use stoichiometric amounts of water, but also smaller or larger amounts. The sol which forms can be adjusted to the viscosity desired for the composition by means of appropriate parameters: for example, degree of condensation, solvent or pH. Further details of the sol-gel method are described, for example, in C. J. Brinker, G. W. Scherer: "Sol-Gel Science—The Physics and Chemistry of Sol-Gel Processing", Academic Press, Boston, San Diego, New York, Sydney (1990).

The matrix former may commonly include a solvent. Solvents which can be used suitably include not only water but also organic solvents or mixtures. These are the customary solvents used in the coating field. Examples of suitable organic solvents are alcohols, preferably lower aliphatic alcohols ($C_1$-$C_8$ alcohols), such as methanol, ethanol, 1-propanol, isopropanol and 1-butanol, ketones, preferably lower dialkyl ketones, such as acetone and methyl isobutyl ketone, ethers, preferably lower dialkyl ethers, such as diethyl ether, or diol monoethers, amides, such as dimethylformamide, tetrahydrofuran, dioxane, sulphoxides, sulphones or butyl glycol and mixtures thereof. Preferably alcohols are used. It is also possible to use high-boiling solvents. In the case of the sol-gel method the solvent may where appropriate be an alcohol which is formed during the hydrolysis.

The nanoscale particulate solids which are present in the composition may be composed of any desired organic or inorganic materials. Organic particulate solids may be composed, for example, of a plastic: for example, from the organic polymers referred to above, which may contain additional functional groups, such as carboxyl groups, for example. Preferably, however the nanoscale particulate solids are inorganic.

Nanoscale inorganic particulate solids are preferably composed of metals or metal compounds, for example (possibly hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides such as, for example, sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$, and $Cd_3P_2$; phosphates, silicates, zirconates, aluminates, stannates, and the corresponding mixed oxides (e.g. metal-tin oxides, such as indium-tin oxide (ITO), antimony-tin oxide (ATO), fluorine-doped tin oxide (FTO), Zn-doped $Al_2O_3$, fluorescent pigments with Y or Eu compounds, or mixed oxides with perovskite structure (such as $BaTiO_3$ and $PbTiO_3$). It is possible also to use mixtures of different nanoscale particulate solids.

The nanoscale inorganic particulate solids preferably comprise an oxide, oxide hydrate, nitride or carbide of Si, Al, B, Zn, Cd, Ti, Zr, Ce, Sn, In, La, Fe, Cu, Ta, Nb, V, Mo or W, with particular preference of Si, Al, B, Ta, Ti, and Zr. Particular preference is given to using oxides and oxide hydrates. Preferred nanoscale inorganic particulate solids are $SiO_2$, $Al_2O_3$, ITO, ATO, $Ta_2O_5$, AlOOH, $ZrO_2$ and $TiO_2$, such as boehmite and colloidal $SiO_2$. The nanoparticles are available commercially, for example; for example, nanoscale $SiO_2$ particles are commercial silica products, e.g. silica sols, such as the Levasils®, silica sols from Bayer AG, or pyrogenic silicas, examples being the Aerosil products from Degussa. Nanoparticles can be prepared, for example, by the sol-gel method or by other methods known to the person skilled in the art.

Nanoscale particulate solids possess an average particle diameter (volume average determined by X-ray spectrometry) of less than 1 µm, generally less than 500 nm. The nanoscale particulate solids preferably possess an average particle diameter (volume average determined by X-ray spectrometry) of not more than 300 nm, preferably not more than 200 nm and in particular not more than 50 nm, and more than 1 nm and preferably more than 2 nm, e.g. 1 to 20 nm. This material can be used in the form of a powder but is preferably used in the form of a sol or a suspension.

The solvent suitable for the sol or the suspension is any solvent chosen for such sols or suspensions in accordance with the specific nanoparticle. The solvents are preferably protic solvents, in particular water or alcohol. Examples of suitable solvents are those listed above. The solvent is preferably also suitable for dissolving, suspending or mixing the matrix former to be added later on.

The nanoscale particulate solids can be present in an amount, for example, of at least 5% by weight, preferably at least 10% by weight and more preferably at least 15% by weight, based on the total weight of the composition. Depending on the density of the nanoparticles the composition may contain up to 50% by weight or up to 75% by weight, or beyond, of nanoparticles.

The nanoscale particles can be produced in conventional manner, such as by flame pyrolysis, plasma processes, colloid techniques, sol-gel operations, controlled nucleation and growth operations, MOCVD processes and emulsion processes. These processes are described in detail in the literature.

In one embodiment of particular significance the nanoparticles can be in surface-modified form. The surface modification of nanoscale particulate solids is a prior art process, as described for example in WO 93/21127 (DE 4212633). Nanoparticles of this kind modified with surface groups, and their production, are known in the art and are described for example in WO 98/51747 (DE 19746885) and WO 01/51220.

The nanoparticles can be surface-modified with crosslinked organic surface groups. The surface groups are with particular preference, however, groups which are able to undergo a reaction with an added acid or base, so that the charge of the nanoparticles can be changed by this means. To put it another way, the surface groups themselves have an acidic or basic group (acid/base function according to Lewis or Brönsted). The groups in question are preferably protic groups. By protic groups are meant—in analogy to protic solvents—groups which are able to contain or release protons and/or to form hydrogen bonds. The groups in question can also be prototropic groups.

The surface modification is preferably an electrosteric surface modification, with which nanoparticles are surface-modified with a "shell" of acidic or basic groups which are able to intensify or attenuate the surface charge effect as a function of the pK value of the surface group.

By means of the surface modification it becomes possible to adjust with precision the interaction between the nanoparticles as a function of pH, through a suitable choice of the surface groups, and to tailor the rheology. Without surface modification, it is necessary to rely on the chemical surface nature of the particles, which is a physical constant that varies from one material to another, as shown by the literature zeta potentials of different particle suspensions. Thus by surface modification, for example, carboxyl groups or amino groups can be applied to nanaparticles and very different properties in respect of the pH values set can be produced.

The production of surface-modified nanoscale particles is known to the person skilled in the art and can be carried out in principle in two different ways: namely first by surface modification of nanoscale particulate solids which have already been produced, and secondly by producing these inorganic particulate solids using one or more compounds suitable for surface modification. All of the compounds specified below for subsequent surface modification are also suitable for surface modification directly during production of the particles.

If surface modification is carried out on nanoscale particles which have already been produced, difunctional surface modifiers (with a molecular weight below 500, for example) are suitable for this purpose that have at least one group able to react or at least interact with (functional) groups present on the surface of the nanoscale particulate solids (such as OH groups in the case of oxides, for example), and have at least one further functional group which is able to react preferably with the acid or base used (to form surface charges).

Preferably covalent and/or coordinative bonds are formed for the development of the bond with the nanoparticles. Examples of functional groups of the surface modifiers which bring about attachment to the nanoparticles are —$SiX_c$, in which X is as defined in formula (I) and is preferably alkoxy and c is 1, 2 or 3 and is preferably 3, β-diketone groups, carboxylic acid groups, amino groups, amino acid residues, lactam groups and protein structures. If desired it is also possible for primary surface modification to take place in order to create an appropriate coupling group for the actual difunctional surface modifier.

The second group, by way of which preferably a reaction can take place with the acid or base used to increase the surface charge, can be, for example, a group with an acidic/basic action or a prototropic or protic group, examples being acid residues, such as —COOH, —$SO_3H$, —POOH or CH-acidic groups, Lewis-acidic or Lewis-basic groups, amines, ammonium radicals, SiO groups, AlOOH groups and other amphoteric oxides, for example.

Specific examples of organic compounds which can be used for surface modifying the nanoscale particulate solids are, for example, saturated or unsaturated dicarboxylic acids, amino carboxylic acids, diamines, abovementioned silanes of the formula (I) with a suitable functional group in the radical R, such as a carboxyl or amino group, β-dicarbonyl compounds with a suitable functional group, such as β-carbonyl carboxylic acids, and the like.

In accordance with the invention the surface charge of the nanoparticles is increased by addition and reaction with an acid or base as a function of the zero point as an absolute value. The person skilled in the art is aware that the surface of particles commonly carries groups which in general are relatively reactive. Examples of surface groups present on such particles include residue valencies, such as hydroxyl groups and oxy groups, in the case of metal oxide particles, for example, or thiol groups and thio groups, in the case of metal sulphides, for example, or amino, amide and imide groups, in the case of nitrides, for example. This palette of surface groups which can be reacted with an acid/base can be extended purposively by means of the above-described surface modification and in a way which is appropriate to the particular requirements.

As a result of the presence of anionic and/or cationic groups, the nanoparticles generally have a defined surface charge. In accordance with the invention nanoparticles are used whose surface charge can be adjusted by changing the pH and/or by adding a base or acid. The reaction in question can be, for example, the reaction of a base with hydroxyl groups on the nanoparticles, forming a negatively charged $O^-$ surface group. Conversely, for example, a cationic surface group can be produced by an acid—an ammonium group, for example. Alternatively or additionally the reaction can take place with surface groups of the above-described surface-modified nanoparticles. In accordance with the invention the surface charge of the nanoparticles is increased by reaction with an acid or base.

The increase here refers of course to the absolute value of the overall charge present on the particles. Through the reaction with the acid or base there may also be a switch in the sign of the surface charge, the critical factor in accordance with the invention being the absolute value. Where the initial particles have a positive overall surface charge, therefore, a negative overall surface charge may well lead, as a result of reaction with the acid/base, to an increase in the surface charge if the absolute value is greater than in the case of the initial particles (e.g. >+5).

One measure of the surface charge is the zeta potential, with which the person skilled in the art is familiar. For any given materials, the zeta potential is a function of the chemistry of the particle surface and can be shifted in size by way of the pH, since the change in pH may result in a change in the surface charge. The acid or base is added preferably in such a way that the zeta potential of the nanoscale particles is less than or equal to 0.3 mV or greater than or equal to +3 mV and more preferably still less than or equal to −1.0 mV or greater than or equal to +1.0 mV. In accordance with the increase in the surface charge the addition of the base or acid increases the absolute value of the zeta potential.

Measurement methods for determining the zeta potential are known to the person skilled in the art. In the invention the zeta potential was determined by measuring the velocity of the nanoparticles in an electrical field (direct current) (electrophoresis). The measurement can take place, for example, by acoustophoresis. The zeta potential is measured on the compositions prepared.

The acid or base can be any compound known to the person skilled in the art that is suitable for increasing the surface charge. The compounds in question can be Lewis acids or Lewis bases and in particular Brönsted acids or Brönsted bases. Examples of acids are hydrochloric acid, phosphoric acid, acetic acid, formic acid or ammonium salts. Examples of bases are ammonia, amines and quaternary ammonium hydroxides, alkali metal carbonates, alkali metal hydroxides, such as NaOH and KOH, and alkaline earth metal hydroxides such as $Ca(OH)_2$. A preferred base is a quaternary ammonium hydroxide, e.g. $NR'_4OH$, in which R', identical or different, can be an alkyl, having 1 to 6 carbon atoms for example, cycloalkyl, having 5 to 12 carbon atoms for example, or an aryl, having 6 to 12 carbon atoms for example, or the nitrogen atom can be part of a heterocyclic ring, examples being imidazolinium or pyridinium compounds. Examples of amines have the formula $NR''_3$, in which R" is H or R' as defined above.

It is preferred to use bases, so that a negative surface charge comes about (negative zeta potential). In terms of its strength and amount, for example, the base or acid used is chosen so that the surface charge is increased appropriately. The advantageous acid/base and the suitable amount depend on the materials used, on the amounts of these materials and on the specific requirements, in particular the non-Newtonian behaviour, and can be determined readily by the person skilled in the art on the basis of the present invention.

The addition of the acid or base to the nanoparticles for the purpose of increasing the surface charge by reaction with the surface groups can take place at any desired point in time during the preparation of the non-Newtonian composition. Preferably the addition takes place to a sol of the nanoparticles, in other words prior to mixing with the matrix former. Heating is possible if desired in order to facilitate the reaction of the acid/base, but there is generally no need for heating.

The development of the non-Newtonian behaviour in the composition is the result of a complex interplay between the components used, and/or of the solvent content. This is known to the person skilled in the art. In order to obtain non-Newtonian behaviour it may be necessary to remove solvents, for example. By means of the present invention the person skilled in the art is provided with another parameter, namely the increase in the surface charge of the nanoparticles, to bring the rheology of the composition, in combination with other, known measures, to the desired state.

In the composition it is possible for there to be further additives which are normally added in the art in accordance with the purpose and desired properties. Specific examples are thixotropic agents, crosslinking agents, solvents, those mentioned above for example, organic and inorganic colour pigments, metal colloids, as carriers of optical functions, for example, dyes, UV absorbers, lubricants, levelling agents, wetting agents, adhesion promoters, inert nanoparticles and initiators.

Inert nanoparticles are nanoscale particulate solids which under the conditions prevailing in the compositions of the invention do not react with acids or bases and hence do not change their surface charge. The rheology of the composition is not changed by the inert nanoparticles, at least as a function of the addition of acid or base. Suitable materials for the nanoparticles include in principle all the aforementioned materials for nanoparticles, with the stated restriction.

The initiator may serve for thermally or photochemically induced crosslinking. Suitable initiators include all familiar initiators/initiator systems known to the skilled worker, including free-radical photoinitiators, free-radical thermal initiators, cationic photoinitiators, cationic thermal initiators, and any desired combinations thereof.

As crosslinking agents it is possible to use the organic compounds customary in the art which have at least two functional groups. Naturally the functional groups are appropriately to be chosen such that crosslinking of the composition is able to take place by way of them.

The organically modified inorganic binders may where appropriate comprise, as an admixture, organic polymers as well, which where appropriate have functional groups for crosslinking. Examples that may be referred to are the examples of organic polymers set out above.

As set forth above, the person skilled in the art is aware of the measures for obtaining non-Newtonian behaviour. Specific ranges for such measures can be found, for example, in WO 01/51220. The composition may only become non-Newtonian after it has already been used, for example, for coating. For example, the composition can be applied to a substrate and not converted into a non-Newtonian composition until after application, by removal of solvent, for example. The composition is then processed further, by embossing or printing, for example, in the non-Newtonian state.

Non-Newtonian compositions of this kind possess diverse possibilities for use. The compositions are suitable, for example, for coating, such as for slot coating, knife coating or brushing, or for film casting, or as a printing paste; as set forth above, the non-Newtonian behaviour may not develop until after the composition has been applied to a substrate. Control over the rheology by means of the process of the invention is particularly suitable not least for coatings with surface reliefs, especially microstructurable surface reliefs. These may be obtained, for example, by the process described in WO 01/51220.

Where the composition is applied as a coating composition or as a printing ink to a substrate, it is possible to use any desired substrate. Examples of such are metal, glass, ceramic, paper, plastic, textiles or natural materials such as wood, for example. Examples that may be mentioned of metal substrates include copper, aluminium, brass, iron and zinc. Examples of plastics substrates are polycarbonate, polymethyl methacrylate, polyacrylates and polyethylene terephthalate. The substrates may be in any form, for example as a sheet or film. Of course, surface-treated substrates are also suitable for producing microstructured surfaces, examples being painted or metallized surfaces.

The composition can be applied in conventional manner. In this case it is possible to employ wet-chemical coating methods. Examples are spin coating, (electro)deposition coating, knife coating, spraying, squirting, pouring, brushing, flow coating, film casting, blade coating, slot coating, meniscus coating, curtain coating, roller application or customary printing methods, such as screen printing or flexographic printing. Preference is given to continuous coating methods such as flat spraying, flexographic printing, roller application or wet-chemical film coating techniques.

Surface reliefs are suitably produced by printing and embossing processes. Suitable printing processes include all customary processes of letter press and gravure, and in particular screen printing processes.

Where a surface relief is to be produced which is preferably microstructured, embossing in the applied composition takes place by way of customary embossing device. This may be, for example, a die or a roller. Details of the known embossing processes can be found for example in WO 01/51220.

Known in the art are hot embossing and reactive embossing. In contrast to reactive embossing, where curing takes place for as long as the embossing device is present in the coating composition, with the composition of the invention it is not necessary, owing to the non-Newtonian behaviour set in accordance with the invention, to carry out curing until the embossing device has been removed from the coating composition. This subsequent curing takes place, for example, by radiation crosslinking, preferably by irradiation with UV radiation. In this way it is possible to achieve extremely high processing speeds.

Irrespective of the particular use of the composition, it is finished by a final curing or compaction step. Curing preferably embraces crosslinking by way of functional groups present in the matrix former. Curing is carried out in particular in the form of a thermal cure, a radiation cure or a combination thereof. Preference is given to UV curing.

The compositions can be chosen so that opaque or transparent, electrically conducing, photo conductive or insulating coatings or materials are obtained. It is preferred, particularly for optical applications, including holographic applications, to produce transparent coatings.

The compositions of the invention can be used with advantage for coated substrates with a microstructured surface relief for producing optical or electronic microstructures. Examples are optical components, such as microlenses and microlens arrays, fresnel lenses, microfresnel lenses and arrays, light guide systems, optical waveguides and waveguide components, optical gratings, diffraction gratings, holograms, data storage media, digital, optically readable memories, antireflective (motheye) structures, light traps for photovoltaic applications, labelling, embossed antiglare coatings, microreactors, microtitre plates, relief structures on aerodynamic and hydrodynamic surfaces, and surfaces with special tactility, transparent, electrically conductive relief structures, optical reliefs on PC or PMMA sheets, security marks, reflective coats for traffic signs, stochastic microstructures with fractal substructures (lotus leaf structures), and embossed resist structures for the patterning of semiconductor materials.

Holographic optical micropatterns which can be produced on glass are suitable, for example, as light guides for architectural glazing, for decorative purposes, for product identification or as holographic mirrors for picture screens in windows or for head-up displays in automotive and aircraft applications. Examples of such patterns are their machine readability and the brilliant optical quality. For planarization the specimens may be provided with a topcoat having a different refractive index, in order to improve abrasion resistance and copy protection.

The compositions of the invention allow materials suitable for embossing which have a relatively low viscosity and a low refractive index for glass, and which can also be processed using flexible dies.

BRIEF DESCRIPTION OF THE DRAWINGS

The present invention is further described in the detailed description which follows, in reference to the noted plurality of drawings wherein.

DETAILED DESCRIPTION OF THE INVENTION

The example which follows serves to illustrate the present invention further.

EXAMPLE

A) Preparation
a) Preparation of a Coating Composition

To prepare a nanoscale $SiO_2$ sol, 20.48 g (0.098 moles) of tetraethyl orthosilicate (TEOS) is added to 50.85 g of ethanol (solution A). 1.75 g of a 1-molar ammonia solution is diluted with 34.41 g of water (solution B). Hydrolysis and precondensation take place by addition of solution A to solution B over the course of 1 h. After 24 h at 70° C. nanoparticles are formed which have a mean particle radius of 5 nm in a sol having a solids content of 5.5% by weight.

The coating matrix is prepared by adding 27 g (1.5 mol) of water to 236.12 g (1 mol) of 3-glycidyloxypropyltrimethoxysilane (GPTS). Heating under reflux for 24 h is followed by removal of the solvent (methanol) by vacuum distillation.

In order to change the zeta potential of the nanoscale $SiO_2$ particles, 24 mg, 48 mg, 192 mg and 216 mg of tetrahexylammonium hydroxide (THAH, 40% in water) respectively are added to 107.5 g of the resultant $SiO_2$ sol with vigorous stirring over 30 minutes at 25° C. 2.5 g of the GPTS sol are added to the mixture and stirring is carried out for 30 minutes. $GPTS/SiO_2$/THAH sols are obtained which have a pH of 8.4 for 24 mg, 9.2 for 48 mg, 9.8 for 192 mg and 10.4 for 216 mg of THAH.

The viscosity as a function of shear rate is measured using a rotational viscosimeter (Physica; Rheolab MC 120). The zeta potential is measured using a Zetasizer ESA-Sample SSP-1, MATEC (velocity of the nanoparticles in an electrical field (direct current) acoustophoresis determination).

B) Evaluation of the Non-Newtonian Behaviour

Figure 1:
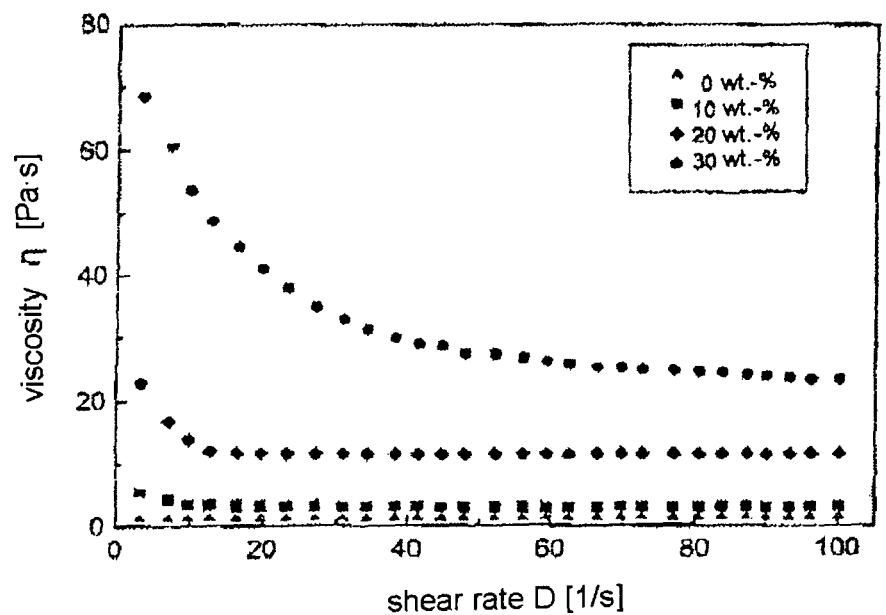
FIG. 1 is a graph showing the viscosity of a comparative composition as a function of the shear rate.

The above-prepared compositions with $SiO_2$ particles are analyzed in respect of their non-Newtonian behaviour by means of a viscosity measurement as a function of the rate of shearing stress. FIG. 1 indicates the results for prior art compositions with no increase in surface charge, while FIG. 2 shows the results obtained on the compositions of the invention, which had been reacted with variable amounts of a base (THAH).

Accordingly, the prior art compositions shown in FIG. 1 exhibit a pseudoplastic behaviour, evident from the increase in the initial region, when the $SiO_2$ nanoparticle content reaches 20% by weight. The observed rise of the curve is very much steeper for the composition containing 20% by weight of $SiO_2$ nanoparticles than in the case of 30% by weight $SiO_2$. This means that the composition with a greater pseudoplasticity effect (30% by weight) exhibits a longer relaxation time of the viscosity.

Figure 2:
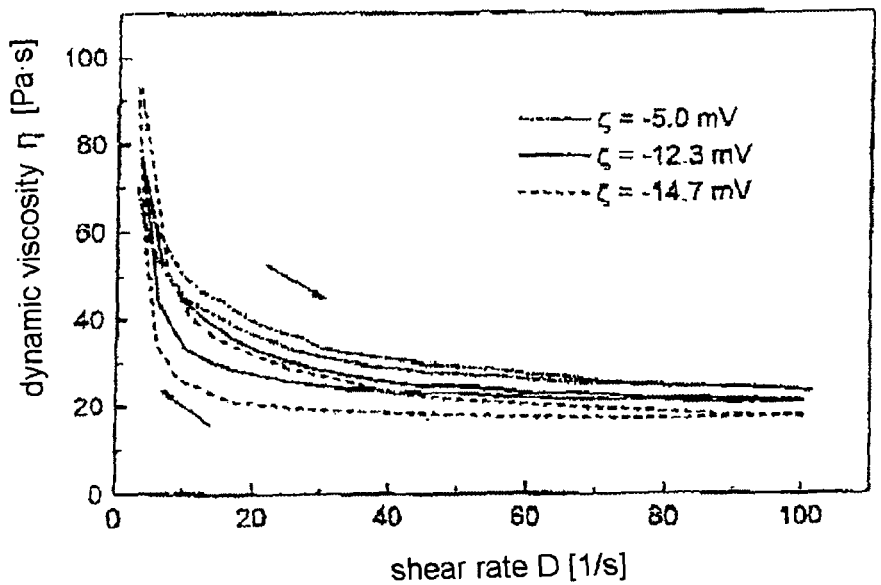
FIG. 2 is a graph showing the viscosity of a composition according to the present invention as a function of the shear rate.

Set out in FIG. 2 are inventive compositions containing 30% by weight $SiO_2$ nanoparticles and with an addition of THAH in an amount of 24 mg, 48 mg or 192 mg, respectively. Measurements of the zeta potential gave a result of −5.0 mV for the composition of 24 mg of THAH, −12.3 mV for 48 mg and −14.7 mV for 192 mg. With these compositions the results were different for rising and falling shear rates, so that each curve forms two branches; that is, the behaviour was thixotropic. In the low-shear-rate region the sol has a viscosity of 70 Pa·s with a zeta potential of −5 mV, 78 Pa·s with a zeta potential of −12.3 mV, and 93 Pa·s with a zeta potential of −14.7 mV. At D=100 1/s there is a deviation of 18 Pa·s, which is within the bounds of measurement accuracy.

A comparison with the result from FIG. 1 shows that the level of the pseudoplasticity effect is comparable or slightly increased. In particular, for the inventive compositions, the rises with increasing addition of THAH are much steeper than for the prior art. This is particularly evident in the case of the branch for falling shear rate, which is particularly significant for the embossing operation. This means that by adding the base it is possible to achieve shorter relaxation times, the shortest relaxation time being observed for the highest addition of THAH.

For structuring, a high pseudoplasticity effect and a short relaxation time are necessary in order to allow effective structuring, if the die is to be removed before curing. Long relaxation times lead to more rapid smoothing of an embossed structure in the period between the removal of the embossing device and curing, thereby impairing the accuracy of the structure.

What is claimed is:

1. A substrate with a coating, wherein the coating comprises at least one of a cured and a compacted composition with non-Newtonian behavior and has a microstructured surface relief, and wherein the composition comprises a matrix former and nanoscale, optionally surface-modified solid particles, a surface charge of the particles having been adjusted by adding a base or an acid thereto.

2. The substrate of claim 1, wherein a surface charge of the particles has been adjusted by adding an acid thereto.

3. The substrate of claim 1, wherein the matrix former comprises at least one of an inorganic polycondensate and a precursor thereof.

4. The substrate of claim 3, wherein the at least one of an inorganic polycondensate and a precursor thereof is prepared from one or more hydrolyzable compounds that comprise compounds of one or more of Si, Al, B, Sn, Ti, Zr, V, and Zn.

5. The substrate of claim 4, wherein the at least one of an inorganic polycondensate and a precursor thereof is prepared from one or more hydrolyzable compounds that comprise one or more silanes of general formula $R_aSiX_{(4-a)}$ in which the radicals R are identical or different non-hydrolyzable groups, the radicals X are identical or different hydryrolyzable groups or hydroxyl groups, and a is 1, 2 or 3.

6. The substrate of claim 5, wherein at least one silane is of general formula $R_aSiX_{(4-a)}$ wherein a is 1.

7. The substrate of claim 1, wherein the nanoscale particles comprise one or more of $SiO_2$, $Al_2O_3$, ITO, ATO, AlOOH, $Ta_2O_5$, $ZrO_2$ and $TiO_2$.

8. The substrate of claim 1, wherein the nanoscale particles have an average particle diameter (volume average determined by X-ray spectrometry) of not more than 200 nm.

9. The composition of claim 1, wherein the nanoscale particles comprise surface-modified particles.

10. A holographic or micromechanical device, wherein the device comprises a substrate with a coating that comprises at least one of a cured and compacted composition with non-Newtonian behavior, which composition comprises a matrix former and nanoscale, optionally surface-modified solid particles, a surface charge of the particles having been adjusted by adding a base or an acid thereto.

11. A method for providing a substrate with a coating having a microstructured surface relief, wherein the method comprises applying to the substrate a coating composition with non-Newtonian behavior that comprises a matrix former and nanoscale, optionally surface-modified solid particles, a surface charge of the particles having been adjusted by adding a base or an acid thereto, and producing the microstructured surface relief in the coating prior to at least one of curing and compacting the coating.

12. The method of claim 11, wherein producing the microstructured surface relief comprises at least one of a printing and an embossing process.

13. The method of claim 12, wherein curing takes place by UV radiation.

14. The method of claim 11, wherein the matrix former comprises at least one of an inorganic polycondensate and a precursor thereof.

15. The method of claim 14, wherein the at least one of an inorganic polycondensate and a precursor thereof is prepared from one or more hydrolyzable compounds that comprise compounds of one or more of Si, Al, B, Sn, Ti, Zr, V, and Zn.

16. The method of claim 15, wherein the at least one of an inorganic polycondensate and a precursor thereof is prepared from one or more hydrolyzable compounds that comprise one or more silanes of general formula $R_aSiX_{(4-a)}$ in which the radicals R are identical or different non-hydrolyzable groups, the radicals X are identical or different hydryrolyzable groups or hydroxyl groups, and a is 1, 2 or 3.

17. The method of claim 16, wherein at least one silane is of general formula $R_aSiX_{(4-a)}$ wherein a is 1.

18. The method of claim 11, wherein the nanoscale particles comprise one or more of $SiO_2$, $Al_2O_3$, ITO, ATO, AlOOH, $Ta_2O_5$, $ZrO_2$ and $TiO_2$.

19. The method of claim 11, wherein the nanoscale particles have an average particle diameter (volume average determined by X-ray spectrometry) of not more than 200 nm.

* * * * *